Jan. 30, 1923.

C. H. NORTON.
GRINDING MACHINE.
FILED JULY 3, 1920.

WITNESS
Harold W. Eaton

INVENTOR
Charles H. Norton
BY
Clayton L. Jenks
ATTORNEY

Jan. 30, 1923.

C. H. NORTON.
GRINDING MACHINE.
FILED JULY 3, 1920.

WITNESS
Harold W. Eaton

INVENTOR
Charles H. Norton
BY
Clayton R. Jenks
ATTORNEY

Jan. 30, 1923.
C. H. NORTON.
GRINDING MACHINE.
FILED JULY 3, 1920.
1,443,924.
10 SHEETS—SHEET 4.
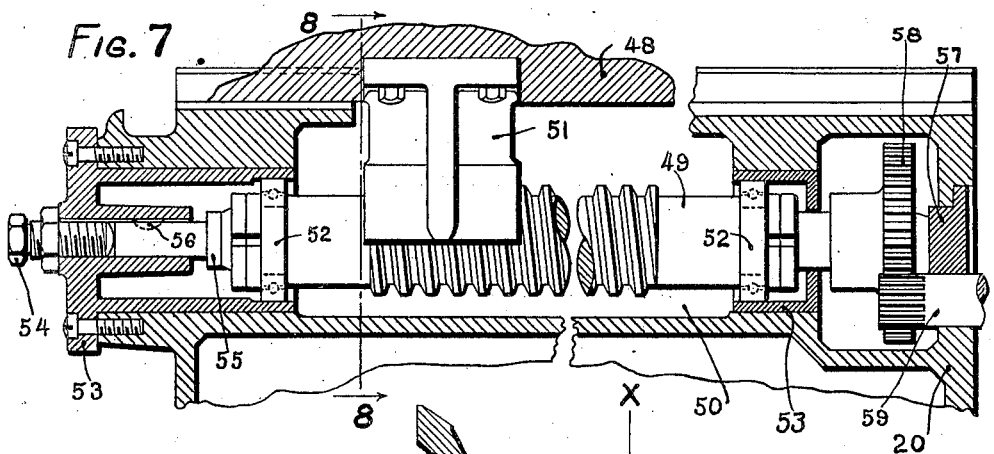
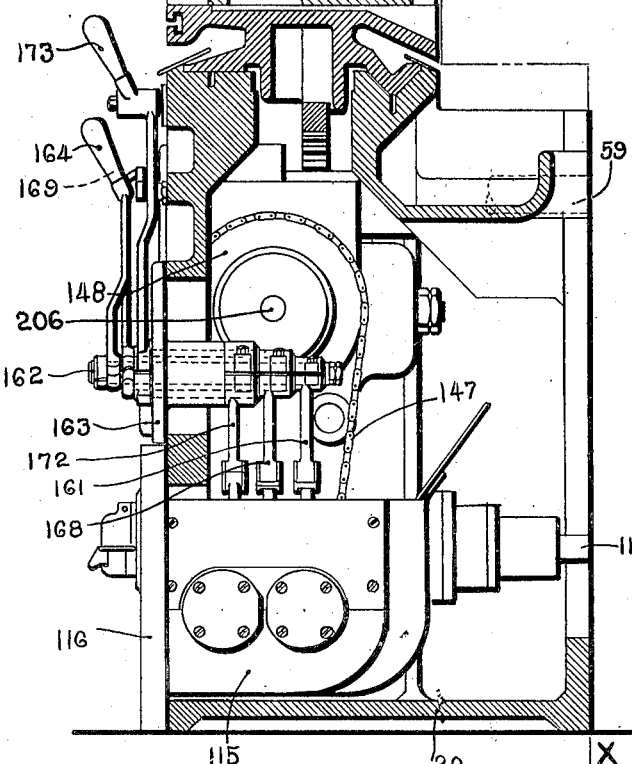
WITNESS
Harold W. Eaton
Fig. 5
INVENTOR
Charles H. Norton
BY
Clayton R. Jenks
ATTORNEY

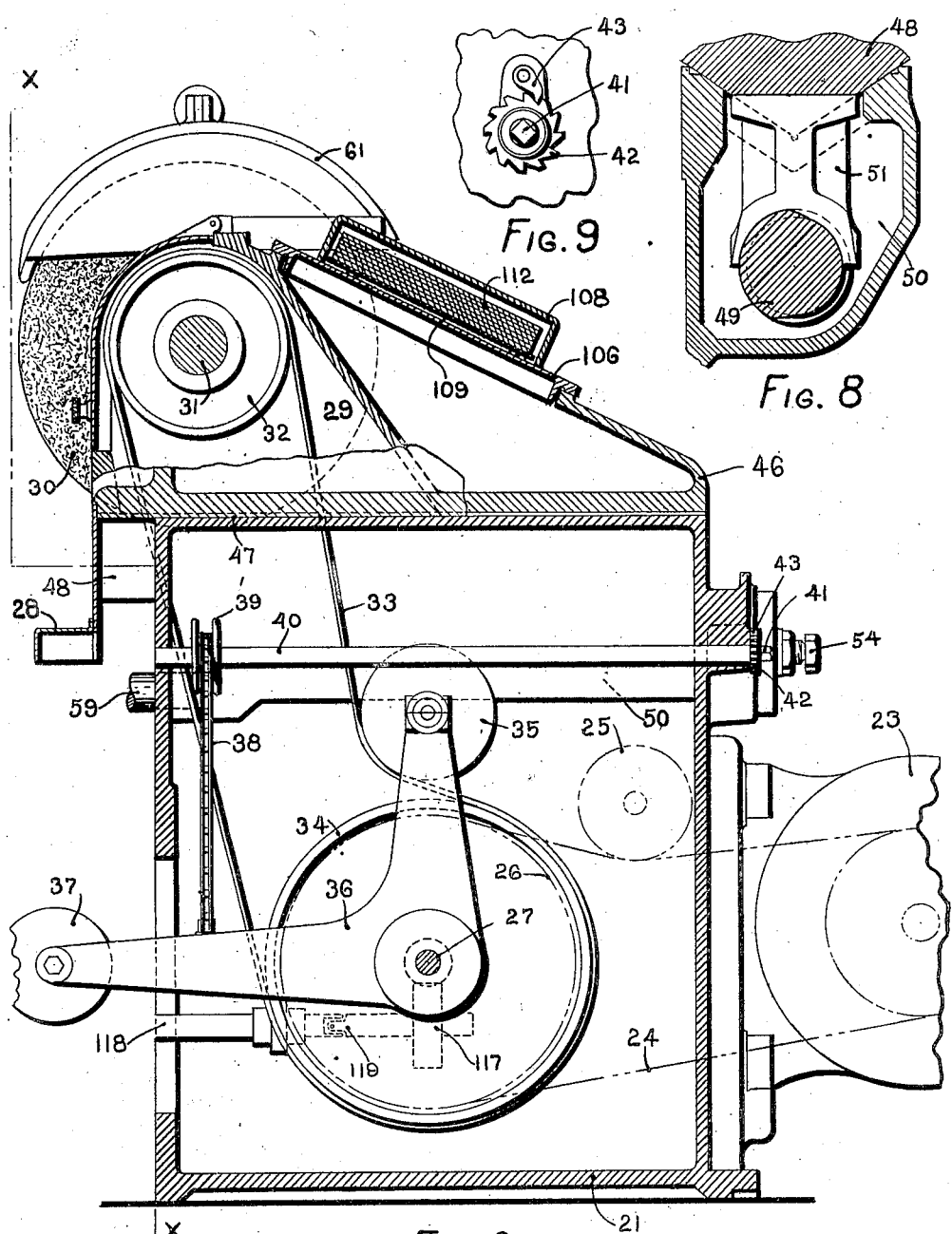

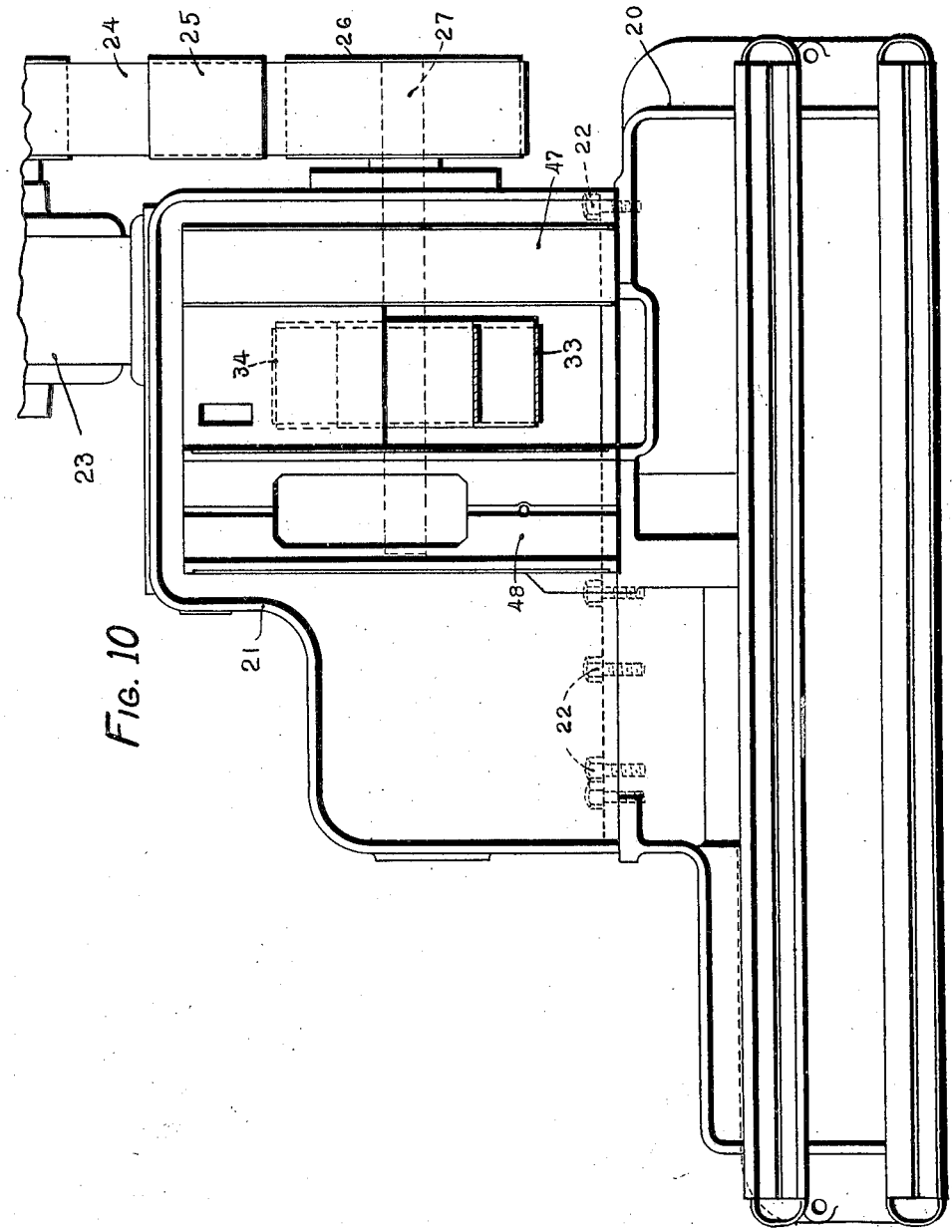

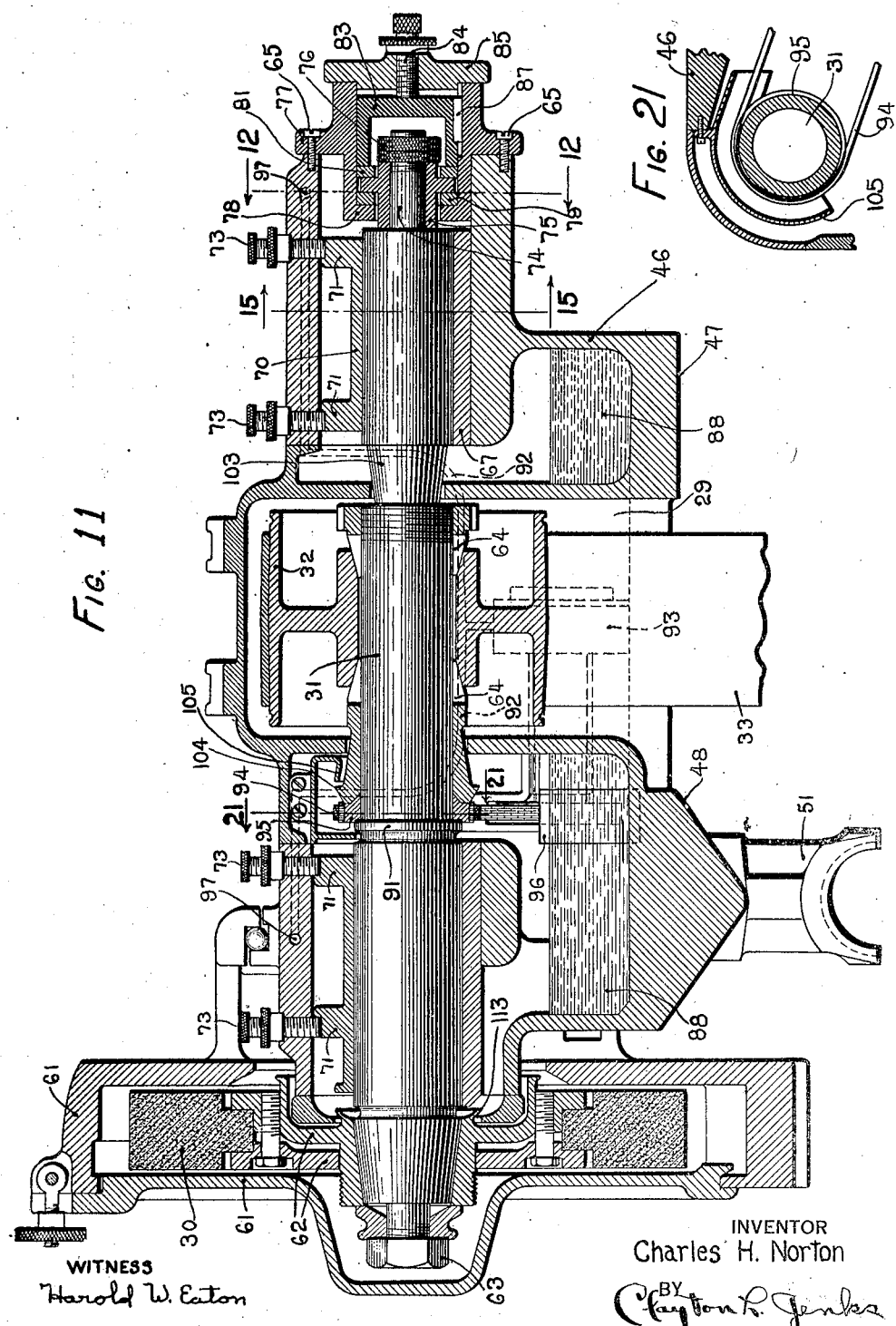

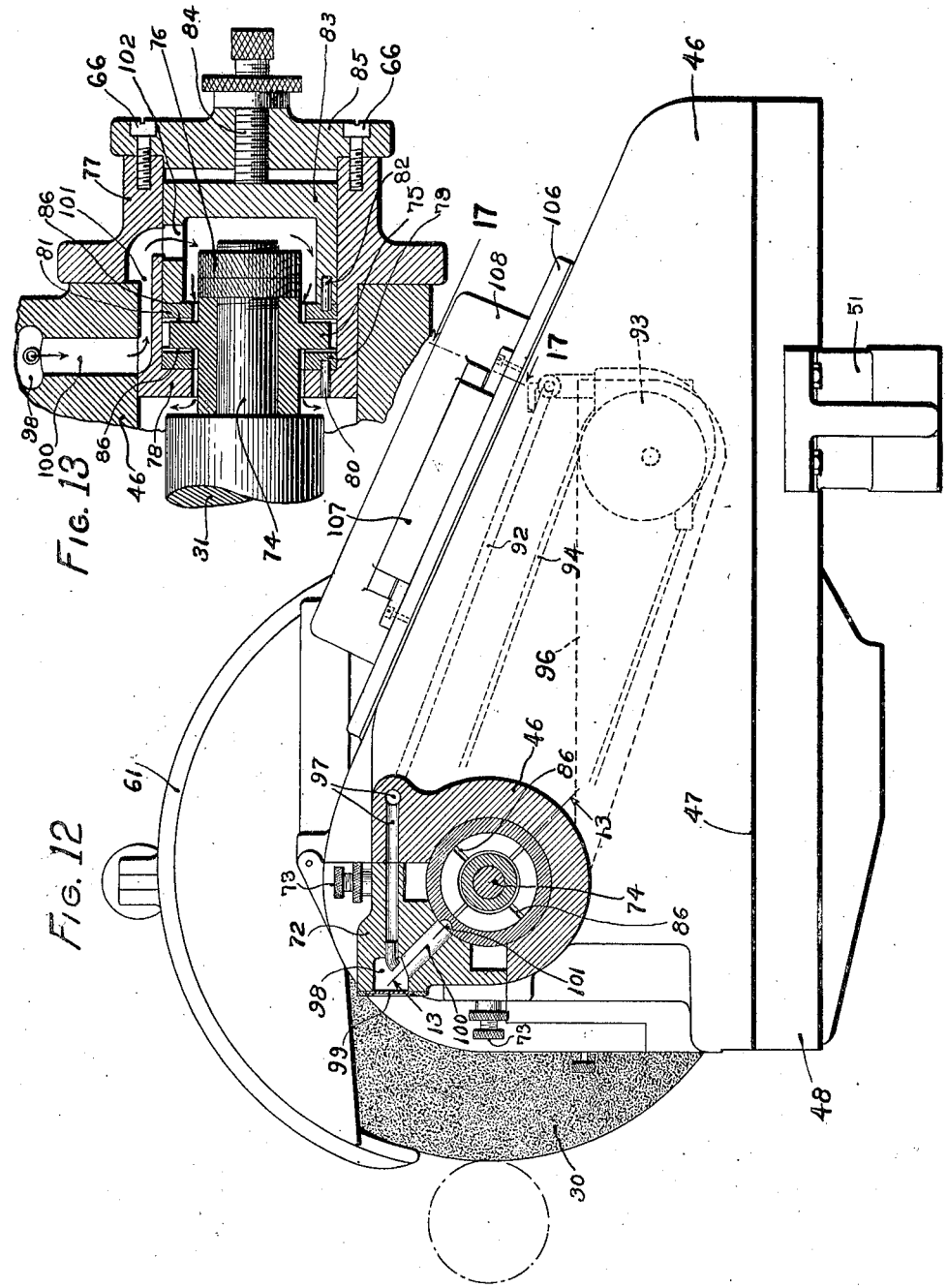

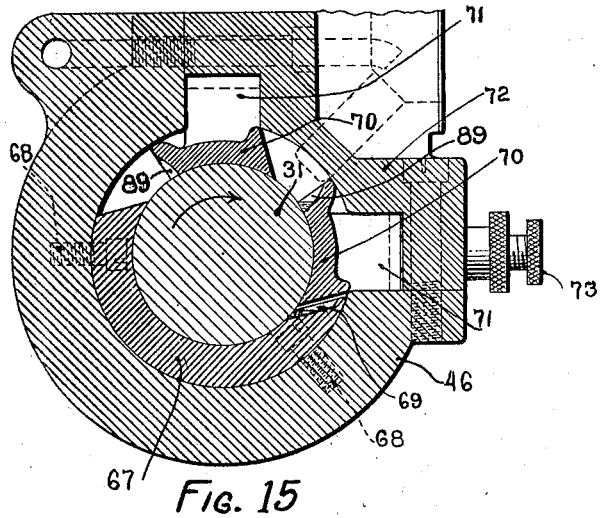
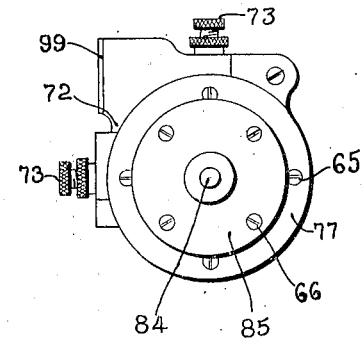
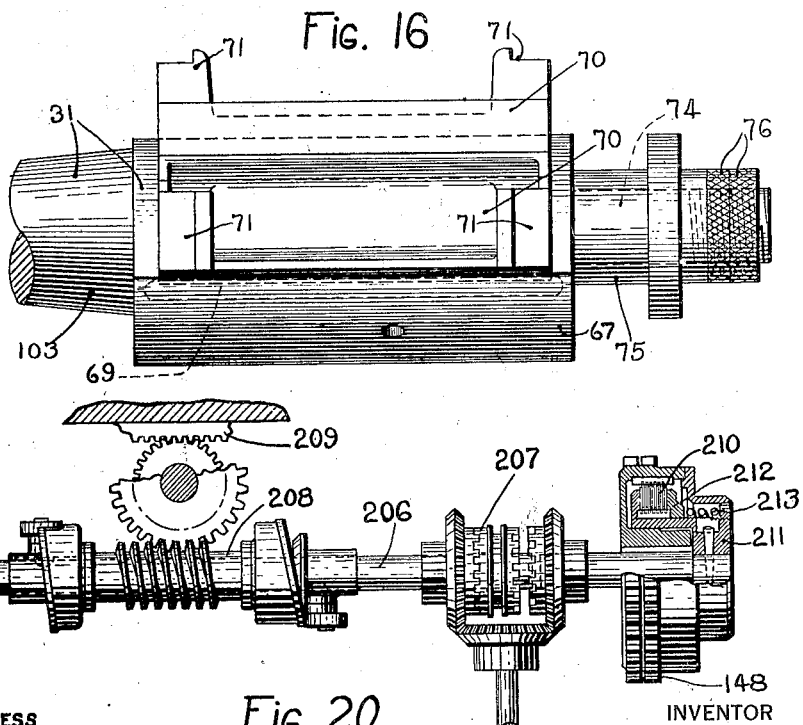

Jan. 30, 1923.

C. H. NORTON.
GRINDING MACHINE.
FILED JULY 3, 1920.

WITNESS
Harold W. Eaton

INVENTOR
Charles H. Norton
BY
Clayton L. Jenks
ATTORNEY

Patented Jan. 30, 1923.

1,443,924

UNITED STATES PATENT OFFICE.

CHARLES H. NORTON, OF WORCESTER, MASSACHUSETTS, ASSIGNOR TO NORTON COMPANY, OF WORCESTER, MASSACHUSETTS, A CORPORATION OF MASSACHUSETTS.

GRINDING MACHINE.

Application filed July 3, 1920. Serial No. 393,913.

*To all whom it may concern:*

Be it known that I, CHARLES H. NORTON, a citizen of the United States of America, residing at Worcester, in the county of Worcester and State of Massachusetts, have invented certain new and useful Improvements in Grinding Machines, of which the following is a full, clear, and exact specification.

My invention relates to grinding machines and more particularly to cylindrical grinding machines of that type in which the work is rotatively mounted on a reciprocable table and the abrasive wheel, grinding with its peripheral face, is positively fed towards the work as the stock is removed.

The principal object of the invention is to provide a grinding machine of simple design which may easily be assembled and efficiently operated, which will grind rapidly and yet with fine precision and which is capable of withstanding the stresses and wear of production grinding and effecting uniform results for a long period of time.

One of the more specific objects of the invention is to make a grinding machine from separate units, one of which carries the wheel and the other the work, whereby different sized machines may be built up from a standard wheel base and work-supporting bases of different lengths.

Another object is to provide a wheel slide and cross feed construction which permits feeding the wheel accurately into the work, and minimizes any twisting effect which might be produced by applying the cross feed power at one side of the wheel. To accomplish this object, I arrange the belt which drives the wheel substantially at the center of the spindle and the wheel slide, and locate the cross feed screw between the wheel and the belt and preferably under the V-way. In connection with this mechanism, a device including a belt-tightening roll is provided for applying tension to the wheel spindle belt and means is utilized for easily removing the pressure of this belt-tightening roll when it is necessary to replace the belt.

A further object of my invention is to provide a change-speed table driving mechanism whereby the operator can change directly from any working speed to a relatively slow truing speed by performing a single operation.

A further object of the invention is to provide an improved power transmission mechanism including change-speed devices and control levers therefor for traversing the table and rotating the work at various speeds which permit the work and the table to be controlled independently of each other or to be stopped together, either in case of accident or in normal usage.

Another object is to so arrange the transmission and the control levers for obtaining the various speeds of the table traverse and work rotation that the operator can readily tell, by observing the relative positions of the levers, the relation between the work rotation and the table traverse.

These features of the invention, and such others as may hereinafter appear, will be best understood from the following description taken in connection with the accompanying drawings of one embodiment of the invention, in which:—

Figure 1:
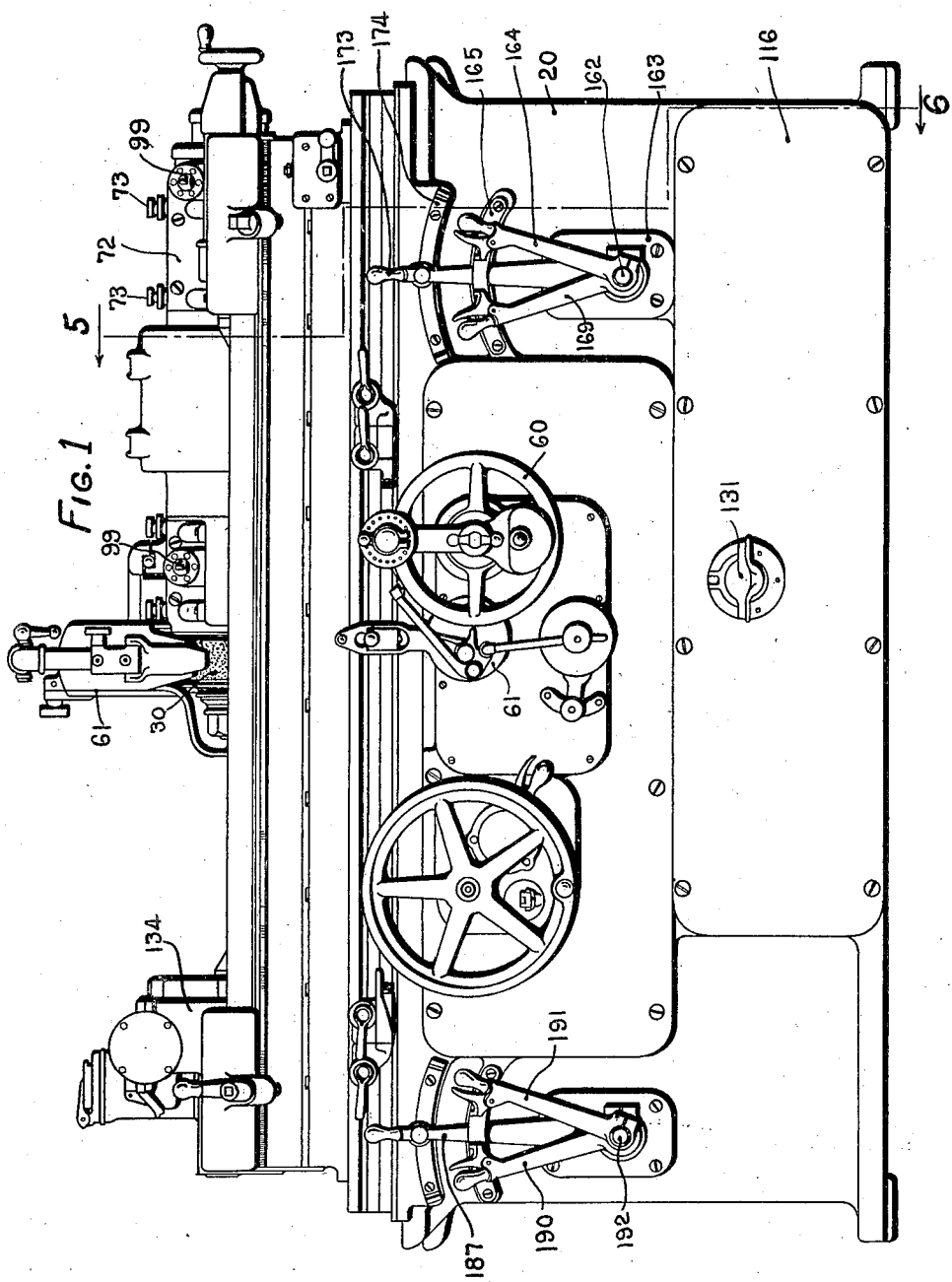
Figure 1 is a front elevation of the grinding machine.
Figure 17:
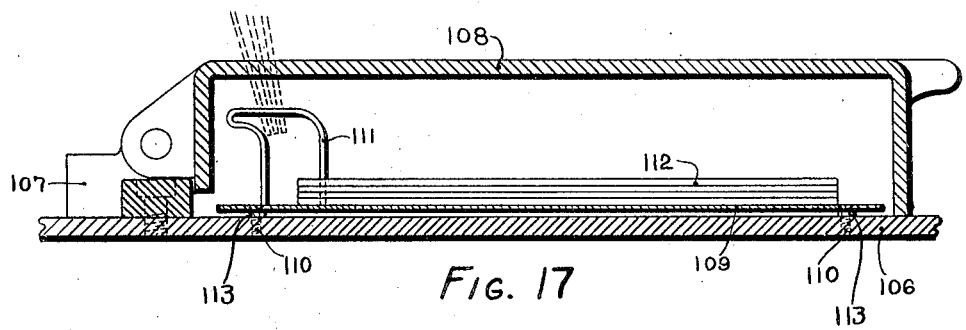
Figure 18:
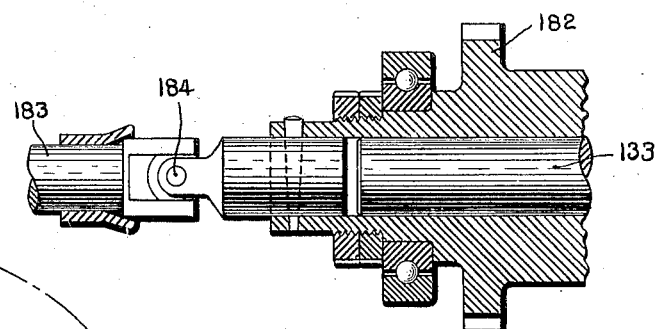
Figure 19:
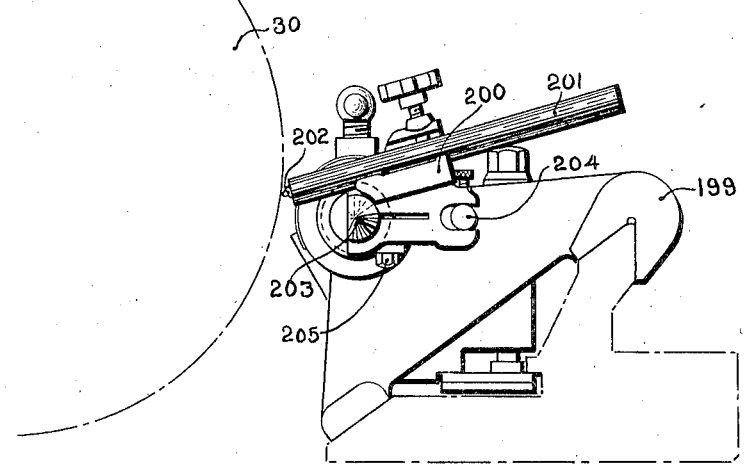

Figs. 5 and 6 taken together form a sectional elevation taken substantially on the line 5—6 of Fig. 1, certain parts being omitted;

Fig. 7 is a longitudinal sectional view taken substantially on the center of the wheel slide adjusting screw;

Fig. 8 is a sectional view taken on the line 8—8 of Fig. 7;

Fig. 9 is a detail view showing the ratchet by which the belt-tightening pulley shown in Fig. 6 is held in inoperative position;

Fig. 10 is a plan view of the two-unit base forming the lower part of the machine, the wheel slide, work table and the driving mechanism therefor being omitted;

Fig. 11 is a central vertical section taken through the wheel spindle, looking toward the rear of the machine;

Fig. 12 is substantially a right-hand elevation of the wheel slide, the wheel spindle thrust bearing being shown in section on the line 12—12 of Fig. 11;

Fig. 13 is a section through the thrust bearing on the line 13—13 of Fig. 12;

Fig. 14 is an end view of the wheel spindle thrust bearing;

Fig. 15 is a section on the line 15—15 of Fig. 11;

Fig. 16 is a side elevation of the bearing blocks and spindle shown in Figs. 11 and 15;

Fig. 17 is a section on the line 17—17 of Fig. 12, showing the construction of the housing which contains the sheets of instruction for the use of the machine;

Fig. 18 is a detail sectional view showing a part of the power transmission to the headstock or work drive;

Fig. 19 is an end view of the tailstock showing the diamond holder and the diamond attached for truing the wheel;

Fig. 20 is an elevational view, parts being shown in section, of a part of the table driving mechanism;

Fig. 21 is a sectional detail taken through the spindle and parts associated therewith on the line 21—21 of Fig. 11.

In accordance with that feature of the invention which relates to the standard unit construction of a grinding machine base as shown particularly in Figs. 1, 5, 6 and 10, the base comprises two principal members; a work-supporting bed 20, hereinafter called the work base, and a wheel-supporting bed 21, termed the wheel base, each of which constitutes a self-contained and separable unit of the machine. As shown particularly in Fig. 10, the two bases are secured together by screws 22 passing through suitable flanges on the wheel base 21 and threaded into the work base 20. The bases are preferably constructed to bring the parts of the wheel feed mechanism into alignment and in order to obviate the necessity for accurately aligning any further shafts, flexible connections are preferably provided for such power transmitting parts as pass from one to the other of the units, as will be more fully described. Power for driving the machine may be taken from the usual shafting, if desired, but it is preferred to attach a motor 23 to the rear of the wheel base 21, (Figs. 6 and 10) which is connected by a belt 24 passing over an idle pulley 25 with a pulley 26 mounted on the end of a shaft 27 having bearings in the wheel base 21. This shaft is the main shaft of the machine from which power is taken for all moving parts.

The grinding wheel 30 is mounted on a spindle 31 which carries a rigidly mounted pulley 32 driven by a belt 33 which passes over a pulley 34 carried by the main shaft 27 and is protected by the water guard 28 carried by the wheel slide 46, as fully described in my Patent No. 1,261,156 dated April 2, 1918. The slack side of the belt 33 is provided with a belt-tightening idle pulley 35 carried on the vertical arm of a bell crank 36 loosely mounted on the shaft 27. The horizontal arm of the bell crank bears a counterweight 37 by which the belt is maintained under a uniform tension. In order to facilitate the insertion of a new wheel driving belt a novel means is provided for relieving the tension of the belt tightening mechanism. This is shown particularly in Figs. 6 and 9, where it will be seen that the horizontal arm of the bell crank 36 is connected by a chain 38 with a spool 39 carried by a shaft 40. This shaft is mounted in suitable bearings in the wheel base 21 and its rear end is provided with a squared head 41 to which any convenient form of crank or wrench may be applied to turn the shaft, thereby lifting the counterweight and relieving the belt 33 from the pressure of the idle pulley 35. In order that it may not be necessary to hold the counterweight in elevated position by hand when working on the belt, a ratchet wheel 42 is mounted on the shaft and a cooperating pawl 43 provided.

One of the features of this invention relates to the mechanism by which the wheel is fed toward and from the work. Heretofore it has been customary to move the wheel slide by means of a worm mounted in the wheel base substantially in the middle of and below the slide and cooperating with a nut thereon. When the worm is turned to force the wheel into the work, there is a strong twisting tendency exerted on the wheel slide, for the reason that the worm is in the center of the slide while the wheel, which by engagement with the work resists movement of the slide, is at one side. In order to reduce this twisting tendency to a minimum and also to provide ample room for the belt drive of the spindle, the present invention contemplates arranging the cross feed worm in proximity to the wheel and away from the belt drive and preferably directly below the V-way 48 which is near the edge of the wheel slide adjacent the wheel.

As is shown in Figs. 6, 7, 8 and 11, the wheel spindle 31 is carried by a wheel slide 46 which is provided with a flat way 47 on the side remote from the wheel and a V-way 48 on the side adjacent the wheel, these ways cooperating with corresponding ways on the wheel base. A worm or screw 49 is mounted in the wheel base in a chamber 50 which may be used as an oil container, directly below the V-way 48. Depending from the V-way is a half nut 51 (Fig. 11) which engages the thread on the screw. An opening is provided in the middle of the way on the wheel base, as is shown in Figs. 7 and 8, through which the half nut projects. When the screw is rotated the table is moved toward or from the work. The screw 49 is carried by ball bearings 52 near each end. These bearings are each mounted in caps 53, the rear or left-hand cap in Fig. 7 being provided with a thrust bearing to take up longitudinal play in the worm. This cap is attached to the wheel base by suitable screws and at its center is provided with a cap screw 54 having the usual check nut. The cap bears against a hardened steel plug 55 non-rotatably but slidably mounted in the cap by means of a key 56. The enlarged end of this plug bears against the end of the screw 49 and prevents any end play therein.

The opposite end of the screw bears against a somewhat similar hardened steel plate 57 suitably mounted in the wheel base. The forward end of the screw 49 is provided with a gear 58 which meshes with a pinion on the end of a shaft 59 mounted in the front base and having the usual connection to a hand wheel 60 (Fig. 1) so that the wheel slide may be actuated to vary the depth of cut. As shown in Fig. 7, the pinion cut on the end of shaft 59 may be slipped from engagement with gear 58 and through the bearing opening in the casing and thus permit separation of the two parts of the wheel feed mechanism when the bases are disconnected. The wheel 60 may be turned by hand to move the wheel toward and from the work or it may be connected with a power actuated mechanism for automatically feeding the wheel into the work. The power actuated mechanism forms no part of the present invention but it may be substantially as indicated at 16 (Fig. 1) which preferably is similar to the wheel feeding mechanism shown in the U. S. patent to Wilcox No. 1,261,083 dated April 2, 1918, to which reference may be had for a more detailed disclosure.

The construction of the bearing for the wheel spindle 31 in the wheel slide 46, together with the oiling system and adjustment means for the bearing, which involve improvements over a somewhat similar device shown in my Patent No. 1,191,936 dated July 25, 1916, are specifically set forth and claimed in my copending application, Serial Number 448,403, filed Feb. 28, 1921.

Referring particularly to Fig. 11, there is shown the grinding wheel 30 partially enclosed in a housing 61, which may be of any desired construction, and attached to the spindle 31 by suitable flanges 62 and a nut 63. The wheel slide 46 is provided centrally with an opening 29 for the pulley 32 and wheel driving belt 33. The pulley 32 is rigidly mounted on the spindle by means of two conical bushings 64 having split ends, which are wedged between the pulley and the spindle.

One of the greatest difficulties encountered in modern grinding machines has been that the wheel spindle which is run at high speed and carries a heavy load is likely to stick either from lack of proper lubrication or on account of the bearings being adjusted too tightly on the spindle. In order to overcome this difficulty, I have provided bearings and lubricating mechanism which furnish a continuous oil film on the spindle. The bearings on both sides of the wheel pulley are substantially alike, the main difference being that the spindle is of larger diameter on one side, hence but one of these bearings will be described in detail.

The downward pull of the wheel spindle belt and the thrust exerted by the wheel as it cuts into the work result in a side pressure on the bearing which slants towards the rear or away from the work at an angle of about 45°. In order to receive this thrust in the best possible manner, a semi-cylindrical bearing member 67 (see Figs. 11, 15 and 16) supports the bottom and back of the shaft and extends around it for nearly 180°, it being so located as to receive the downward and rearward thrust, as is clearly shown in Fig. 15. This bearing member, which is preferably made of hard metal such as bronze, is secured to the wheel slide 46 by screws 68. The openings in the bearing member 67 through which the screws pass are slightly larger than the screws to permit the fixed bearing to expand circumferentially of the spindle and thereby avoid buckling when it becomes heated. A pocket or receptacle 69 is formed at the inner edge of the bearing towards which the spindle rotates to hold oil and distributes it throughout the length of the bearing.

The shaft is held securely seated in this bearing by two smaller segmental bearing members 70 spaced apart circumferentially from each other and from the fixed bearing member 67 to provide oil channels therebetween and permit expansion. These members are made freely adjustable to permit holding the spindle against the hard bearing member 67 with a proper degree of pressure. Each of these floating bearing members 70 is preferably made of soft material, such as Babbitt metal, so as to wear away if the bearing is too tight and so protect the lower hardened bearing member. The part 70 is provided with a pair of lugs 71 fitting loosely in longitudinal channels formed between the bearing member of the wheel slide 46 and a cap 72 (see Fig. 15) which is secured to the wheel slide by suitable screws shown in dotted lines. When this cap is removed, the wheel spindle may be removed from its bearings.

These bearing members are adjustable by fine precision means, which may comprise screws 73 carrying lock nuts, and in order to prevent the operator from putting undue pressure on the bearings and thereby causing them to stick, these screws are provided with round knurled heads which prohibit the use of the usual wrench and make it difficult for the operator to set up these screws by any other means then by hand. The size of the head of the screw is such that if the operator turns them by hand he cannot put sufficient pressure on the bearings to cause them to stick. These floating bearing members 70 are provided with pockets 89 similar to pocket 69 described in connection with the lower fixed bearing member, which, in the case of the lowermost of the two members 70, acts as a pocket or receptacle to hold oil when the machine is standing idle so as to insure sufficient lubrication when it is again started. These bearing members 70 are shorter than the bearing members 67, so that any overflow from the ends of the oil pockets therein will move under the influence of gravity or be carried around by the rotating shaft into the pocket 69 and be distributed therealong.

It is similarly of importance that the end thrust or longitudinal play in a grinding wheel spindle shall be capable of delicate adjustment. The specific form illustrated in Figs. 11, 12, 13, 14 and 16 for accomplishing this result, which is claimed in my copending application, Serial No. 579,031, filed Aug. 1, 1922, involves a reduced portion 74 which receives a flanged sleeve 75 held rigidly on the shaft by a pair of lock nuts 76. The projecting end of the wheel slide 46 is bored to receive a cap 77 which is attached to the end of the wheel slide hub by suitable screws 65, as shown in Figs. 11, 13 and 14. The inner end of this cap is provided with an inwardly extending flange 78 which takes the thrust of the wheel spindle in one direction. In order to prolong the wearing qualities of the flange 78, it is provided with a hardened steel collar 79 non-rotatably secured to the flange 78 by a pin 80. It will be apparent that this collar 79 provides a rigid abutment to take the thrust of the spindle to the left as shown in Fig. 13. The thrust of the spindle in the other direction is taken up by a similar hardened steel collar 81 secured by a pin 82 to the end of a cup shaped block 83 which is adjustable toward and from the rigid abutment by means of a screw 84, provided with a round knurled head similar to screws 73 and having the usual lock nut, and which is threaded into a cover 85 secured to the cap 77 by screws 66. The hardened steel collars 79 and 81 are provided with radial grooves 86 for the passage of oil which is delivered by an oiling system, hereinafter described, into the interior of the cup shaped block 83 as is indicated by the arrows in Fig. 13. In order to prevent the block 83 from turning in the cap 77, it is provided with a key 87 as shown in Fig. 11. One advantage in this construction is that the thrust bearing is not in close proximity to any of the radial bearing members which generate more or less heat during the operation of the machine. Excessive heat in these parts is liable to cause expansion and a consequent sticking of the thrust bearing.

The oil reservoir for the wheel spindle is located in the bottom of the wheel slide as is indicated at 88, Fig. 11. Oil is taken from this reservoir and delivered through pipes 92 and suitable conduits to the bearings by a pump of the usual centrifugal type as indicated at 93 (Figs. 11 and 12). The pump is driven from the wheel spindle by a chain 94 which receives its power from a suitable sprocket 95 mounted on the wheel spindle. This sprocket is provided with a conical projection on one side which is received by a tapered opening in one of the conical bushings 64. The other side of the sprockets 95 rests against a shoulder 91 formed on the wheel spindle so that the pressure applied by the other conical bushing 64 in securing the pulley 32 to the wheel spindle also acts to clamp the sprocket thereon. The pump 93 may be placed in the oil reservoir as illustrated. In that case the chain 94 which drives the pump dips into the oil in the reservoir. In order to prevent an excessive amount of oil being carried up by the chain which, of course, travels at high speed, the portion of the chain which dips below the oil level is enclosed by a dam 96 indicated in Figs. 11 and 12. It is desirable, however, that some oil shall be applied to the chain; therefore this dam is not made oil tight but there is sucffiient leakage so that when the machine is standing still the interior of the dam will fill up with oil, but when the wheel spindle is started running, this oil is soon carried out by the chain and thereafter sufficient oil will leak into the dam to keep the chain well lubricated but not enough to cause an excessive amount to be thrown off when the chain passes around the wheel spindle.

The connection between the pump and the bearings, as indicated in dotted lines on Figs. 11 and 12, comprises pipes 92 which open into conduits 97 drilled in the wheel slide 46. The left-hand conduit 97, shown in Fig. 11, delivers oil to the center of the left-hand bearing in the same way that the right-hand conduit 97 delivers oil to the end of the right-hand bearing, so that the right-hand bearing oil-delivery mechanism only need be described. The oil flows from conduit 97 to a chamber 98 which is provided with a window or sight opening 99 in order that any cessation in the flow of oil may be observed. From this chamber the oil passes by gravity through a conduit 100 into a longitudinal groove 101 which communicates with a hole 102 in the block 83 so that a continuous stream of oil is delivered to the interior of the block. The oil passes through the grooves 86 in the hardened steel collars as has been described, thereby thoroughly lubricating the thrust bearing, and thence through the interstices between the several members of the radial bearing shown in Fig. 15, dropping into the oil reservoir in the bottom of the wheel slide. If through any accident the supply of oil should be cut off at the pump, this fact will at once be evident to the operator as shown by the cessation of the stream of oil flowing back of the window 99. Also, if the passage of the oil through the bearings should be interrupted, it will cause the chamber 98 back of the window to fill up with oil, which will at once be observed by the operator. By this construction any improper operation of the lubricating system is at once brought to the attention of the operator so that it may be remedied.

In accordance with the wheel spindle mounting, there are provided a number of oil flanges and guards. Between the spindle pulley 32 and the right-hand bearing, as shown in Figs. 11 and 16, there is a tapered portion 103 on the spindle. The object of this is to prevent oil from entering the space occupied by the belt and thereby reducing the efficiency of the belt. This tapered portion is of such an angle that when the spindle is running at normal speed oil will travel by centrifugal action toward the larger end of the taper where it will be thrown off and dropped into the reservoir 88. When the machine is idle the taper of this portion is such that the oil which follows around to the bottom of the shaft by gravity will run down this taper to the right and then return to the reservoir. This will prevent the entrance of any oil into the space reserved for the belt. On the other side of the belt pulley, I provide a tapering flange 104 from which oil is thrown centrifugally into the reservoir 88 and against the oil guard 105 secured to the wheel slide 46 as by screws (Figs. 11 and 21) and extending around the upper and forward portions of the sprocket 95 and flange 104, from whence it is returned to the reservoir 88. The oil guard also catches oil thrown by chain 94.

On the inner wheel flange 62, an oil-throwing flange 113 is provided to prevent the oil from gaining access to the grinding wheel.

For the operator's guidance, I may provide the wheel slide with a number of instruction sheets permanently hinged thereto and supported above the surface of the wheel slide so that any oil or grinding compound which may run down the slide will not injure or deface the pages. A cover also permanently attached to the wheel slide is provided to exclude dust and dirt. As illustrated in Figs. 6, 12 and 17, the wheel slide 46 is shown as having a cover or plate 106 which forms a closure for an opening in the slanting upper surface of the slide. This cover is secured in place by suitable screws and its outer surface has attached thereto a block 107 which forms one member of a hinge, the other member being integral with a box-like cover 108 which in closed position has the edges around its open side closely engaging the plate 106.

If the leaves or pages inside the cover were permitted to rest on the plate 106, water or oil might run down underneath the cover 108 and injure the lowermost pages, therefore a table 109 is provided inside the cover 108 placed slightly above the surface of the plate 106 to which it is attached by screws 110, it being spaced from the plate by suitable bushings 113 surrounding the screws. This plate also carries a hinge member 111 on which the perforated instruction sheets 112 are mounted to slide. These sheets, which are preferably made of cleanable non-tearable material such as celluloid or a heavy paper covered with a transparent material, are punched to receive the hinge members 111 and if desired, the holes may be reenforced with grommets to prevent the sheets from being torn off.

One important feature of this invention relates to the power transmission and controlling mechanism therefor. It is usual in modern grinding machines to provide a number of different speeds for the various parts so that the speeds of rotation and traversing of the work may be varied to suit the particular operation being performed. In accordance with my invention, I provide a multi-speed gear transmission mechanism to obtain the various work rotating and table traversing speeds, which also includes means for producing the wheel truing speed by the movement of a single control member. This is accomplished preferably by employing two parallel units of change speed gearing, each of which comprises a clutch operated high and low speed gearing in series with a slidable set of three speeds, so arranged that one may obtain different speeds by varying the combinations of gears. One unit is connected to drive the table and the other to rotate the work. They are both driven preferably through a friction drive controlled by a stopping and starting clutch mechanism, and all the parts are controlled by two sets of levers on the machine base, as will be more fully described.

Referring to Figs. 1 to 6 inclusive, it being noted that Figs. 5 and 6 make a single sectional view of the machine when the lines X—X are superimposed, the part 59 being shown projecting in Fig. 6 for the sake of clearness, the mechanism for changing the speed is contained in a box 115 formed on the back of a plate 116 attached to the front of the machine by screws. Power is transmitted to this speed-changing mechanism by a flexible connection to the main shaft 27 (Fig. 6) which is provided in order that perfect alignment between the two units of the base may not be necessary.

Power is taken from the shaft 27 by a pair of spiral gears 117 (Figs. 2 and 6) to a shaft 118 having a pair of universal joints 119 by which the desired degree of flexibility is secured. This shaft is connected by one of the universal joints 119 with a sleeve 120 (Fig. 3) which may be connected by means of a clutch consisting of a driving member 121 and a driven member 124 with a shaft 122, a reduced end of which is mounted in the sleeve 120 and its other end in suitable anti-friction bearings in the box 115. The driven member 124 of the clutch is connected to the hollow shaft 122 by means of a key 125 and a series of friction disks 123 alternately connected to the opposed clutch members transmit power to it from the driving member 121.

The clutch members are held in driving engagement by a spring 127, so that if there is a stoppage of the driven parts the clutch will slip and prevent injury to the machine. This spring control of the clutch is made adjustable so that it can be set at the point where sufficient power will be transmitted to operate the moving parts, but any excess demand on the power will cause a slippage. The clutch is moved into inoperative position by a yoke 126 against the power of the spring 127. The end of the spring opposite the member 124 of the clutch is engaged by a bar 128 which extends through a diametrical slot in the shaft 122 and projects on either side thereof This bar is adjustable to vary the tension of the spring by means of a plunger 129 which is positioned in a hole in the interior of the shaft 122. The outer end of this plunger is threaded into the shaft and provided with check nut 130 by which it may be locked in adjusted position. The end of the plunger projects through the plate 116 and is covered by a movable cap 131 which allows ready access for adjusting the tension of the spring.

Power is transmitted from the shaft 122 through a pair of spiral gears 132 to a shaft 133 rotatably mounted in the box 115, and from the left end of shaft 133 to the headstock 134 (Fig. 1) and from its right end to the work traversing mechanism.

The power transmission mechanism on the right of the box 115 is provided with a speed varying mechanism consisting of a clutch operated high and low speed gearing in series with a multi-speed slidable gear set, by which six different speeds may be given to the traversing work table, the construction of which is as follows: The shaft 133 carries non-rotatably mounted thereon a sleeve 135, on both ends of which are gears 136 in mesh with gears 137 loosely mounted on a shaft 138 parralleling the shaft 133. Either one of the gears 137 may be connected to drive the shaft 138 by a sliding clutch 139 keyed to shaft 138 for longitudinal movement thereon to engage cooperating teeth on either of the gears, so that the secondary shaft 138 will be driven at a speed depending upon the ratio of the gears 136 to the gears 137. The shaft 138 carries a sliding sleeve keyed thereon which is provided with a set of three gears 140 of different diameters. This sleeve carrying the gears 140 is keyed to the shaft 138 but may be moved longitudinally thereon so that any one of the gears will be in mesh with one of a set of corresponding gears 141 carried by a sleeve which is loosely mounted on the shaft 133. It will thus be apparent that the shaft 138 may be run at two different speeds and each of these speeds is capable of producing three other speeds in the speed varying gears 140 and 141 which are transmitted to the reciprocating work table. The connection between the gears 141 and the work table is shown in part by Fig. 4 which is a section substantially on the center line of the two shafts 133 and 138. Power is transmitted from the speed varying gears 141 to a sleeve 142 surrounding the shaft 133 by a clutch 143 slidably keyed to an enlarged collar 144, which is in effect integral with the sleeve 142 but as a matter of convenience in assembling the parts is connected with the sleeve 142 by teeth 145 on the respective parts. The left end of the sleeve 142 is provided with a sprocket gear 146 which drives a chain 147 (see Figs. 2 and 5) passing over a sprocket gear 148.

This gear 148 is frictionally connected (Fig. 20) to the table driving shaft 206 which may drive the table through devices substantially as shown and described in my prior Patent No. 1,191,987 dated July 25, 1916, consisting of a reversing clutch mechanism 207 and an easy stop and start means 208 driving to the table rack 209. The means for frictionally connecting the gear to the shaft may consist of a plurality of friction disks 210 alternately connected to the gear 148 and a member 211 rigidly connected to the shaft 206, the disks being held in driving engagement by a ring 212 backed by a spring 213. This frictional driving connection is important because it allows slippage in the table drive in case any undue restraint is placed upon its travel, thereby preventing possible breakage of parts. It will now be apparent that when the clutch 143 is moved to the right (see Fig. 4) power will be transmitted to the table through the chain 147 and the friction drive.

The usual method of truing a wheel in a grinding machine is to mount a diamond or other dressing tool on some part of the work support and then to throw the machine into operation so that relative traversing movement between the wheel and the diamond takes place. When the wheel is to be dressed so as to cut rapidly, this relative traversing movement is substantially the same as the traversing movement employed in grinding, but when a fine finish is desired on the wheel this traversing movement is made very slow, so slow that in order to obtain the finest finish on the wheel it has to be done by hand. One arrangement for truing the wheel is illustrated in Fig. 19 where I have shown a holding member 200, in which there is clamped a diamond carrier 201 having a diamond 202 for dressing the wheel. This particular tool holder is attached to the tailstock 199 by placing it over the center 203 and a projecting pin 204, and then clamping it on the center by means of a screw 205. After the diamond carrier has been clamped in place the truing speed of the table is thrown into operation, which causes the table to traverse at a very slow rate, thereby producing a fine finish on the wheel.

When the clutch 143 is moved from its right or driving position the power supplied to the table is at once cut off and when it is moved to its extreme left position power through a different train of gears is applied to cause the traversing movement of the table at a relatively slow truing speed. The shaft 133, which is driven directly from the spiral gears 132, is provided with a pinion 152 of relatively small diameter in mesh with a large gear 153 carried by a sleeve 154 loosely mounted on the shaft 138, the other end of the sleeve being provided with a pinion 155 which is in turn in mesh with a gear 156 loosely mounted on the sleeve 142. From the ratio of the various gears and pinions it will be evident that the gear 156 will turn at a speed much slower than that of the shaft 133 and in order that this speed may be transmitted to the chain 147, the gear 156 and clutch 143 are provided with cooperating teeth 157 by which the gear and sleeve 142 may be connected. It will be obvious that, whatever may be the speed of the chain as determined by the relative position of the gears 140 and 141 and the speed of the shaft 138, a single movement of the clutch throws out the high speed and throws in the low speed as has been described.

The clutches and sliding gears which have been described are arranged to be shifted by certain levers shown at the right of the machine in Fig. 1. The various clutch controlling yokes are arranged to slide on a rod 158, shown in Figs. 2 and 3. The clutch 143 for throwing in the truing speed or the table speeds derived from gears 141 is engaged by the usual yoke 159 provided with a hub slidable on the rod 158 and connected by a link 160 with an arm 161 (Fig. 5) mounted on the end of a rock shaft 162 carried by a plate 163 secured to the base of the machine. The outer end of this rock shaft carries a lever 164 having a latch to hold it in adjusted position by engagement with a notched segment 165. In a like manner the clutch 139 by which two different speeds are given to the work table is engaged by a yoke 166 connected by a link 167 with an arm 168 secured to a hollow rock shaft surrounding the rock shaft 162 and having on its outer end a lever 169 by which this clutch is moved. The sliding gears 140 are moved on the shaft 138 to bring them into their respective operative relations with respect to the gears 141 by a similar yoke 170 connected by a link 171 with an arm 172 mounted on a hollow rock shaft provided at its outer end with a lever 173. This lever is held in three different positions corresponding to the three operative positions of the gears 140 by a notched segment 174 which is engaged by a suitable plunger on the lever.

From this description it will be seen that the lever 164 is movable into two positions, one of which throws the table into the truing speed and the other throws it into the grinding speed, which speed is determined by the position of the other two levers. The lever 169 has two positions which produce two speeds in the traverse of the work table which is further modified by the lever 173 which has three positions, giving in all six different speeds of the work table, not including the truing speed.

On the left end of the machine, as shown in Fig. 1, there is a similar group of three levers, two of which determine the speed of rotation of the work and the third controls the power supplied to both the work and the traverse of the table. These levers are connected with clutches and sliding gears best shown in Fig. 2, which correspond with the similar parts for reciprocating the table, as above described. The shaft 133 carries a fixedly mounted sleeve 178 having two different sized gears 175 at its ends.

These gears are in mesh with two loosely mounted gears 176 and 177 carried by a shaft 179 arranged parallel to the shaft 133, and between these two gears there is a clutch 180 slidably keyed to the shaft so that either one of these gears may be connected to drive the shaft at two different speeds. In order to produce further adjustment in the speeds imparted to the work, the shaft 179 carries a set of sliding gears 181 keyed thereto, which may be moved to mesh with a corresponding set of gears 182 rotatably mounted on the shaft 133. Motion is transmitted from these gears to the headstock by a shaft 183, the connection between the shaft and the gears being shown particularly in Fig. 18. In order to avoid the necessity of perfect alignment of the shaft 133 and the headstock mechanism, the shaft 183 is provided with universal joints, one of which is shown at 184. The connection between the shaft 183 and the headstock 134 (Fig. 1) may be the same as that shown in the patent to Norton and Wilcox No. 1,271,208 dated January 2, 1918, to which reference may be had for a complete disclosure.

The connection for the left-hand group of levers for controlling the headstock or work rotation is substantially the same as the corresponding connection to the right-hand levers. The sliding gears 181 are positioned in operative relation with any one of the gears 182 by a yoke 185 connected by a link 186 to an arm (not shown) connected with a lever 187 on the front of the machine. This lever is provided with a latch and segment by which it is held in any one of its three positions in the same way as the lever 173 on the other end of the machine. The clutch 180, which determines which of the two speeds is to be employed, is actuated by a yoke 188 connected by means of a link 189 with a lever 190 on the front of the machine. This lever is provided with a latch and segment by which it is held in one or the other of its two positions.

Figure 2:
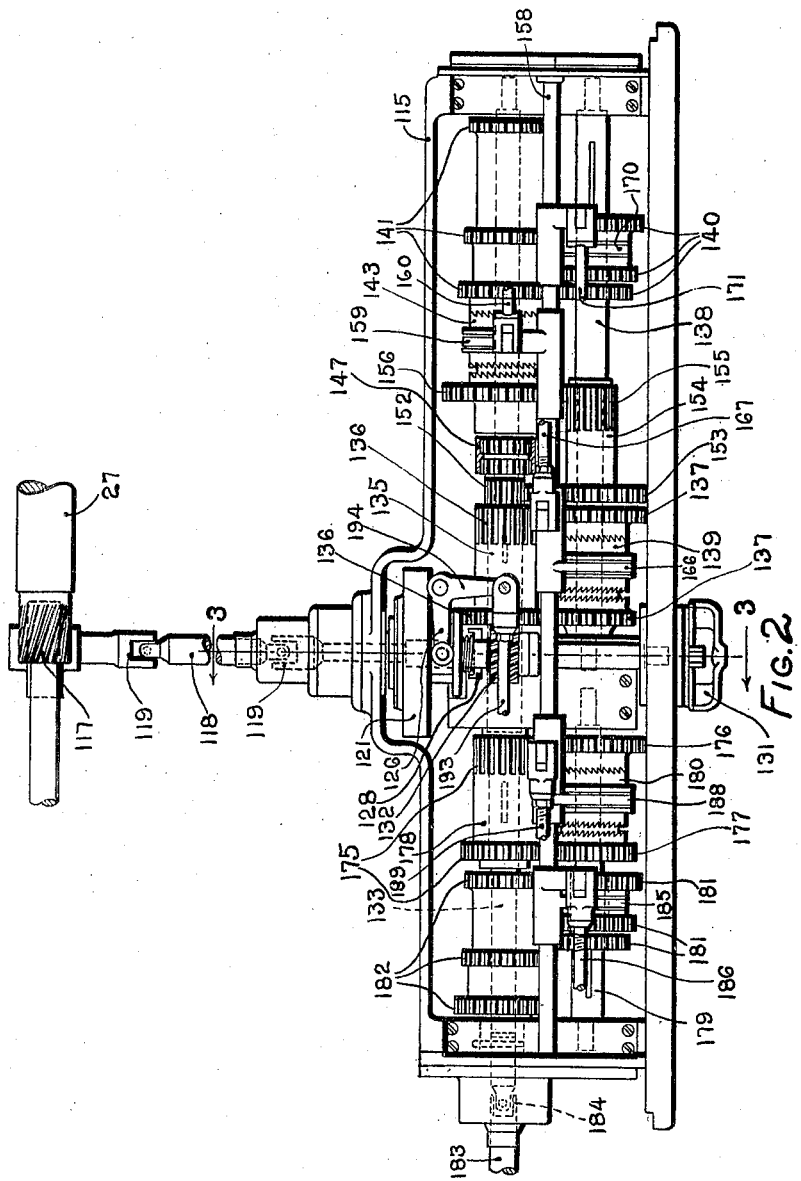
Fig. 2 is a detail plan view showing the plate carrying the speed changing mechanism and certain parts of the transmission, removed from the machine.
Figure 3:
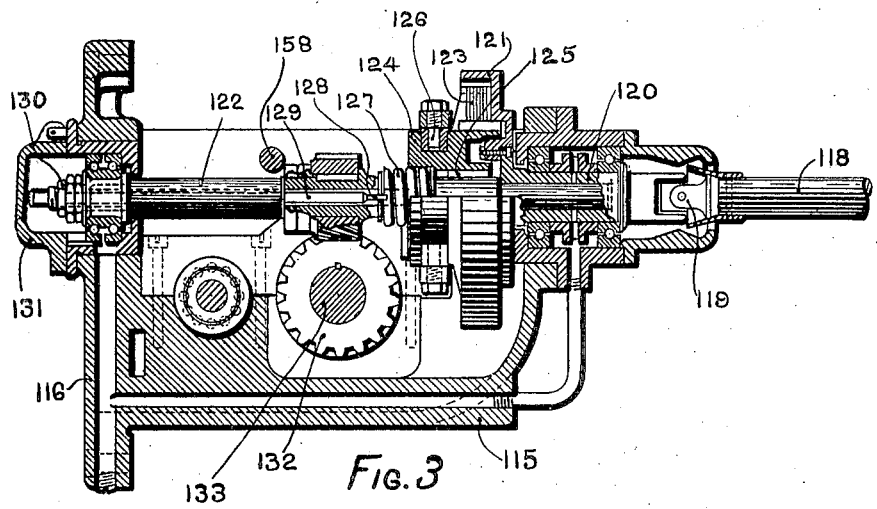
Fig. 3 is a sectional view on the line 3—3 of Fig. 2.
Figure 4:
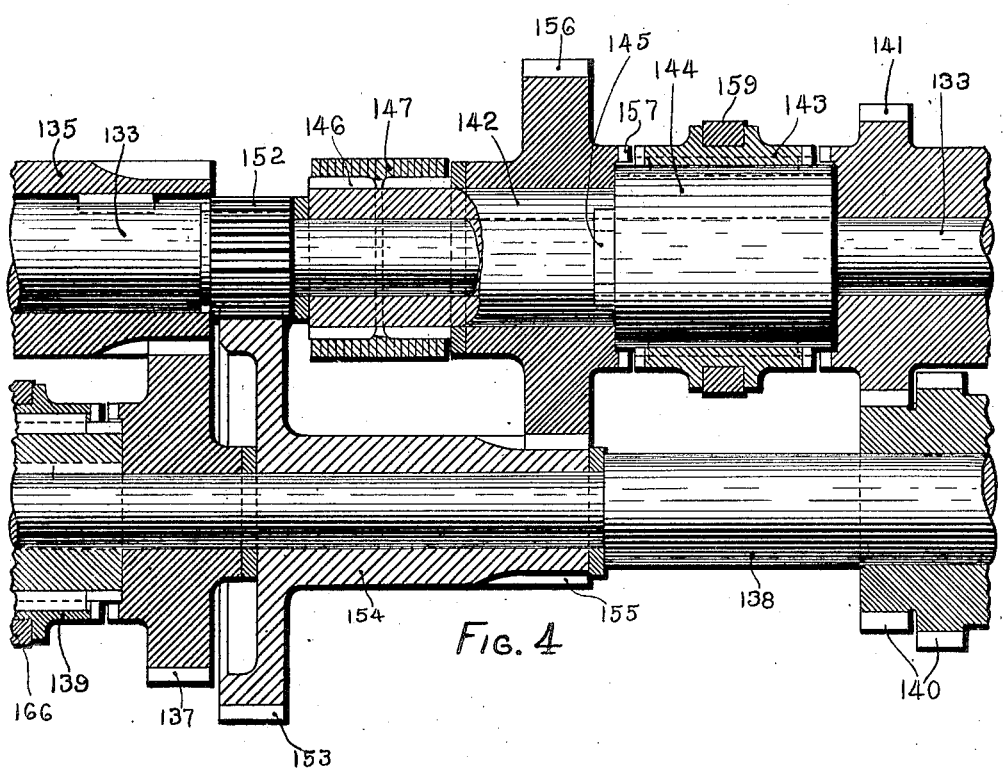
Fig. 4 is a sectional plan of certain parts shown in Fig. 3.

The main clutch 121 is actuated to control the application of power to the two parallel units of the speed changing mechanism by means of a lever 191 mounted on a rock shaft 192 which projects into the interior of the base and is there provided with an arm (not shown) which is in turn connected with a link 193. This link is pivotally connected to a bell crank 194, one arm of which forms the yoke 126 which engages a groove in member 124 of the clutch, as shown in Figs. 2 and 3. By this construction it will be seen that the levers 187 and 190 may be so adjusted as to produce six different speeds of rotation of the work, while the lever 191 may be moved to simultaneously stop the rotation of the work and the traverse of the table.

In order that the operator may be able to tell at a glance whether or not the traverse of the table and the rotation of the work are so related that, for a given wheel width, the work makes a complete revolution while the table travels substantially one wheel width, the various gears of the change-speed mechanism transmitting power to the headstock and to the table are so proportioned and arranged that when the two groups of levers 187, 190 on the left end of the machine (Fig. 1) and 173, 169 on the right end are in similar positions, this most economic result will be attained. In practice it is, however, desirable that there be a slight overlap, and for a 2½" wheel the relation of the rotation of the work and the speed of traverse of the table is such that one revolution of the work will cause the path of the wheel to overlap by a small amount, e. g., 0.2". To illustrate, if the operator decides that the rotation of the work should be that produced by moving the lever 187 to the left from its position shown in Fig. 1, then if he moves the lever 173 also to the left so that it occupies a position similar to that of lever 187, he will be advancing the work along the face of the wheel at the rate of 2.3" per revolution of the work, causing the path of the wheel on the work to overlap 0.2". The gear ratios are such that this holds true for all positions of the levers for this width of wheel.

Having thus described my invention, what I claim and desire to secure by Letters Patent of the United States is:

1. A grinding machine comprising a unitary work-supporting base, a detachable standard grinding wheel-supporting base, means for detachably connecting the two bases together, operating mechanism in each base and flexible power connections therebetween.

2. A grinding machine comprising a unitary work supporting base, a detachable standard grinding wheel supporting base, a wheel slide on the wheel supporting base, a screw mounted in the wheel base operatively connected with the slide to move the same, a hand wheel on the work supporting base, separable power connections from the hand wheel to said screw and means for removably connecting the two bases together.

3. A grinding machine comprising a two-unit base, one of said units carrying a rotatable grinding wheel and the other a work-supporting and traversing mechanism, driving mechanism including a power shaft on one of said units, means for connecting said units together and separable connections for driving the mechanism carried by one unit from the power shaft in the other unit.

4. A grinding machine comprising a two-unit base, one of said units carrying a rotatable grinding wheel and power mechanism to drive the same including a driving shaft, the other unit carrying a reciprocable work-supporting table and means to drive the table and rotate the work, separable, flexible connections between said shaft and the driving mechanism in the work unit and means for fastening the two units together, which permits interchangeability of the grinding wheel unit with any size of work-carrying unit.

5. A grinding machine comprising a standard wheel base unit, a grinding wheel rotatably mounted thereon, a motor attached to said wheel base, a main shaft in said base driven by the motor and power connections from said shaft to said grinding wheel, a work-supporting base unit, work-rotating and reciprocating mechanism carried on the work base, means for connecting said bases and a breakable, flexible power connection from said main shaft in the wheel base to the mechanism in the work base.

6. A grinding machine comprising a standard wheel base unit carrying a movable slide, a rotatable grinding wheel mounted thereon, and a cross feed mechanism therefor in said unit, a work base unit having a work-supporting, traversing table thereon, means for connecting the wheel unit with the work unit, a power shaft on the wheel unit, change-speed mechanism to traverse and rotate the work and controls therefor on the work unit, means on the work unit to operate the cross feed mechanism, detachable, flexible connections between the power shaft and the change-speed mechanism and detachable connections between the cross feed connection and its operating means, whereby the units can be readily assembled or disassembled.

7. A grinding machine having a base, a V-way and a flat way thereon, a grinding wheel slide having correspondingly shaped V and flat slideways adapted to reciprocate on the machine base and cross feed mechanism comprising a part on said slide located substantially beneath the V-way and means mounted in the base cooperating with said part to move the slide.

8. A grinding machine having a base, a power shaft therein, a V-way and a flat way on the base, a grinding wheel slide having correspondingly shaped V and flat ways adapted to move on the ways of the base, a grinding wheel spindle mounted on said slide, a pulley on said spindle, a belt connection from the power shaft to the pulley located between said V and flat ways, and a cross feed mechanism to reciprocate said slide on the ways comprising a screw-threaded member mounted in the machine base and a threaded member on the slide beneath the V-way engaging said screw-threaded member.

9. A grinding machine having a base, two ways including a V-way thereon, a grinding wheel slide having corresponding ways mounted on the base ways, a wheel spindle mounted on said slide having thereon a grinding wheel adjacent one end and a pulley between and above said ways, a driving pulley in the base, a belt connecting said pulleys, the base way between the spindle pulley and the grinding wheel having an opening therethrough, a projection depending from the slide through said opening and a feed screw mounted in the base beneath the opening and cooperating with said projection to move the slide.

10. A grinding machine comprising a base having slideways thereon, a wheel slide movable on said ways, a grinding wheel spindle mounted on the slide with its axis at right angles to the slideways, a power shaft journaled in said base and parallel to the wheel spindle, a belt drive between said power shaft and said wheel spindle and having a direct run on one side, means carrying a belt tightening pulley to tighten the slack side of the belt for any position of the slide and means for swinging the belt tightening pulley away from the belt.

11. A grinding machine comprising a base having a power shaft mounted therein, a wheel slide movable on said base and having a wheel spindle journalled thereon, a belt drive having a straight run between said power shaft and wheel spindle, a movable pulley engaging the belt, a weighted lever support for said pulley mounted on said power shaft, a shaft connected with said weighted lever for swinging it to release the belt, said shaft extending outside the base and having said extended portion in form to be engaged by a suitable tool and pawl and ratchet means for normally preventing reverse rotation of said shaft, whereby the changing of the belt will be facilitated.

12. A grinding machine comprising relatively traversable work and wheel supports, wheel truing means carried by the work support, means for relatively traversing the work and wheel supports at different grinding speeds and at a slower speed for truing the wheel and means for shifting directly from any one of said grinding speeds to the truing speed.

13. In a grinding machine having a reciprocable work table and a rotating grinding wheel, means for reciprocating the table comprising a multi-speed mechanism, means for selecting any one of the speeds, a slow speed mechanism for said table, a main power shaft, and means comprising a clutch mechanism associated therewith to connect the power shaft directly with the slow speed mechanism or with the multi-speed mechanism.

14. In a grinding machine having a rotatable and traversable work support, a drive shaft, a driven member, change-speed gearing adapted to be driven by said shaft for traversing the table at a plurality of grinding speeds, gearing driven by said shaft for obtaining a much slower speed for the table, clutch means to connect either gearing to the driven member, a second driven member for rotating the work and change-speed mechanism driven by said drive shaft for driving said second driven member at different speeds.

15. In a grinding machine, a rotatable grinding wheel, a reciprocable work carrying table, a work rotating support on said table and a self-contained driving mechanism for said wheel, work support and table comprising a power shaft mounted on said machine, speed changing mechanism for reciprocating the table and rotating the work, a friction drive connection between said shaft and speed changing mechanism and friction driven connections between said speed changing mechanism and the table to reciprocate the latter and permit slippage when the restraint put upon the table exceeds a given amount.

16. A grinding machine in which the work is rotated while the work and wheel supports are relatively traversed, having in combination, mechanism for relatively traversing said work and wheel supports at a plurality of different speeds and for rotating said work at a plurality of different speeds and means comprising two groups of levers on the machine for controlling said traversing and rotating movements respectively, said parts being proportioned and arranged so that, for a given wheel width, when the levers of the two groups are in predetermined positions, the relatively traversing support will move substantially one wheel width for each rotation of the work.

17. A grinding machine having a base, a rotatable grinding wheel and a reciprocable work table mounted on the base, work supporting and rotating means on the table, a power driven change speed gear mechanism in the base operatively connected to rotate the work and reciprocate the table comprising a high and low speed gearing in series with a second multi-speed slidable gear set and manually controllable means connected with said mechanism for selecting a desired speed.

18. In a grinding machine comprising a base, a rotatable grinding wheel mounted thereon, a reciprocable work table on the base, means on the table to support and rotate the work, a power shaft in the base, two units of multi-speed gear transmission, each comprising a clutch-operated high and low speed gearing in series with a multi-speed gear set, the units being operatively connected with the work rotating and the table reciprocating mechanisms respectively, a friction clutch connecting the power shaft with the transmission units and manual controls for said units to regulate the speeds of work rotation and table reciprocation independently.

19. In a grinding machine having a base, a rotatable grinding wheel thereon, a reciprocable work table slidably mounted on the base, work supporting and rotating means on the table, a transmission unit having a high and low speed clutch-operated gearing in series with a multi-speed slidable gear set operatively connected to rotate the work, a plurality of manually controlled levers connected to shift the clutches and slidable gears and means comprising a manually controllable friction clutch to connect a source of power with the transmission unit.

20. In a grinding machine having a base, a rotatable grinding wheel thereon, a reciprocable work table slidably mounted on the base, work supporting and rotating means on the table, a power shaft in the base, a two unit change speed gear transmission in the base, each comprising a clutch controlled high and low speed gearing in series with a slidable gear set, one unit being operatively connected to rotate the work and the other to reciprocate the table, manually controlled means including levers operatively connected to the clutches and slidable gears to vary the speeds of rotation and reciprocation of the work and a manually controllable friction drive clutch connecting the two units with the power shaft for stopping the work and the table simultaneously.

Signed at Worcester, Massachusetts, this 25th day of June, 1920.

CHARLES H. NORTON.